(No Model.)
B. L. BLAIR.
BRIDGE.
No. 568,830. Patented Oct. 6, 1896.
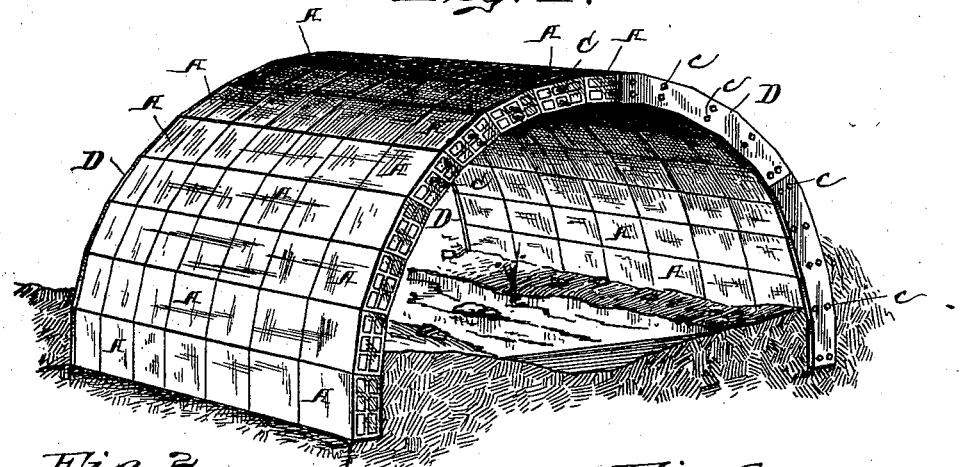
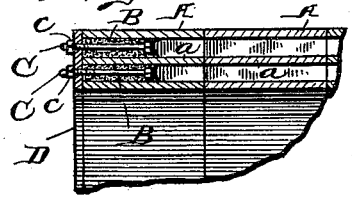
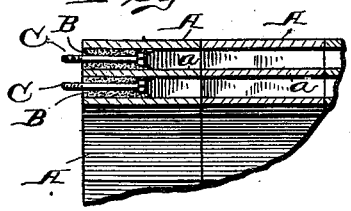
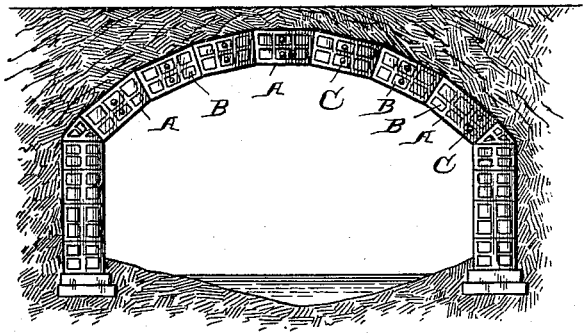
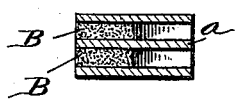
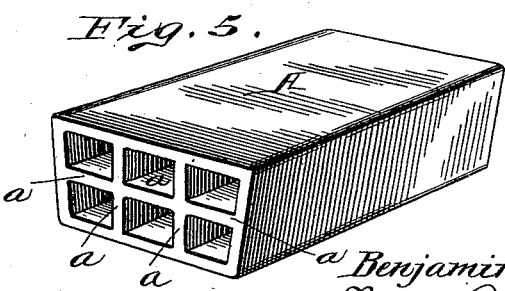
Witnesses
H. S. Nealy,
J. A. Walsh.
Inventor
Benjamin L. Blair,
By Chester Bradford,
Attorney.

UNITED STATES PATENT OFFICE.

BENJAMIN L. BLAIR, OF INDIANAPOLIS, INDIANA.

BRIDGE.

SPECIFICATION forming part of Letters Patent No. 568,830, dated October 6, 1896.

Application filed July 3, 1896. Serial No. 597,994. (No model.)

*To all whom it may concern:*

Be it known that I, BENJAMIN L. BLAIR, a citizen of the United States, residing at Indianapolis, in the county of Marion and State of Indiana, have invented certain new and useful Improvements in Bridges, of which the following is a specification.

Bridges of moderate size have heretofore been constructed from light and comparatively inexpensive materials. Such materials are lacking in enduring qualities, which are of the greatest importance in such structures. Solid masonry is too expensive to be employed in many places, both because the labor involved in its use is comparatively great and because in numerous places stone is not obtainable except at an expense, mainly for transportation, too great to be generally borne. Ordinary building-brick are not regarded as suitable for the purpose, besides being also rather expensive, particularly in the matter of the labor required to put them in place. Clay blocks of sufficient size to overcome these objections must necessarily be made hollow in order that they may dry and burn properly, but the resulting openings in the masonry structure are objectionable because water will enter therein and in cold weather freeze and burst the structure asunder. Such large blocks are, however, in all other particulars very desirable.

It is the object of my invention to obviate the difficulty mentioned; and it consists, generally speaking, in a bridge composed of large hollow clay blocks properly dried and burned, the openings wherein are filled with concrete of some approved mixture, whereby the structure as a whole is rendered solid and comparatively indestructible.

A further feature of my invention, in its preferred form, is to provide the ends of the bridge-arch with metal plates, whereby such arch is protected from breakage from contact with floating debris or accidental blows of any kind.

A bridge embodying my said invention will be first fully described, and the novel features thereof then pointed out in the claims.

Referring to the accompanying drawings, which are made a part hereof, and on which similar letters of reference indicate similar parts, Figure 1 is a perspective view of an arch for a bridge as it appears when first built and before being covered with earth; Fig. 2, a fragmentary sectional view of the complete structure, showing the end protected by the metal plate; Fig. 3, a view similar to Fig. 2, except that the plate is omitted; Fig. 4, a sectional view of one of the blocks from which the bridge is built in cases where no metal plate is used or at a point where such plates are not used; Fig. 5, a perspective view, on an enlarged scale, of one of the blocks separately; Fig. 6, a plan or side view of one of the metal plates of the form which I prefer to employ; and Fig. 7, an end elevation of a bridge embodying my said invention in which the form is varied somewhat, being composed of upright members at the sides with an arched top instead of being in the form of a complete arch.

In said drawings the portions marked A represent the blocks from which the bridge is primarily composed; B, the concrete which is filled into the ends of the blocks or to any desired extent; C, bolts which are embedded in the concrete with their ends projecting to receive the protecting-plates, and D said plates.

The form of the blocks is clearly indicated in the drawings. They are of considerable size, with as many openings and consequent partitions as may be desired. The block illustrated has six openings therein.

The concrete B is of any material from which concrete is usually formed and is filled into the blocks to any extent desired. As it is the intention to lay said blocks closely in cement, so that the joints will be perfectly water-tight, it is believed to be sufficient to fill in a portion of the end blocks only, as illustrated in the drawings, and this is particularly true of all except those situated in or near the earth, where the water comes continually in contact therewith. In almost all cases to so construct the upper portion of the arch would be unnecessary.

The bolts C are in themselves common bolts. They are bedded in the concrete, as shown, with their screw-threaded ends projecting to the outside. They are suitably positioned to receive and hold the plates D.

The protecting-plates D are formed to cover the ends of the blocks, as shown in a portion of Fig. 1. They are held in place by nuts $c$ on the bolts C, as shown. These plates may be plain or flanged, so as to embrace the edges or corners of the blocks.

As a whole, this structure makes a strong, substantial, and durable bridge, and is an excellent substitute for one composed of solid masonry, while it may be produced at a mere fraction of the cost.

Having thus fully described my said invention, what I claim as new, and desire to secure by Letters Patent, is—

1. A bridge composed of hollow clay blocks, the ends whereof at those portions exposed to receive water are filled with concrete, substantially as and for the purposes set forth.

2. A bridge composed of hollow blocks, the ends being filled with concrete embedded therein, and protecting-plates secured to the ends of the bridge by means of bolts, substantially as set forth.

3. The combination, in a bridge, of hollow clay blocks forming the arch, concrete filling the ends of those of said blocks into which by their situation water is apt to enter, bolts embedded in said concrete, and metal plates secured to said bolts and protecting the ends of the arch, the whole being arranged and operating substantially as set forth.

4. As a new article of manufacture, hollow burned-clay blocks for building bridges, the openings wherein are filled with concrete after the blocks are made, whereby water is excluded therefrom, substantially as set forth.

In witness whereof I have hereunto set my hand and seal, at Indianapolis, Indiana, this 29th day of June, A. D. 1896.

BENJAMIN L. BLAIR. [L. S.]

Witnesses:
  H. D. NEALY,
  JAMES A. WALSH.